United States Patent
Mahiaoui et al.

(10) Patent No.: US 10,221,098 B2
(45) Date of Patent: *Mar. 5, 2019

(54) ULTRA-FAST SETTING CEMENT BASED ON AMORPHOUS CALCIUM ALUMINATE COMPRISING A SURFACE TREATMENT

(71) Applicant: KERNEOS, Puteaux (FR)

(72) Inventors: Jamel Mahiaoui, Carcassonne (FR); Jacques Estival, Bourgoin Jallieu (FR); Jean-Noel Bousseau, Loyettes (FR); Anais Martinet, Lyons (FR)

(73) Assignee: KERNEOS, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,315

(22) PCT Filed: May 13, 2015

(86) PCT No.: PCT/FR2015/051276
§ 371 (c)(1),
(2) Date: Nov. 15, 2016

(87) PCT Pub. No.: WO2015/173526
PCT Pub. Date: Nov. 19, 2015

(65) Prior Publication Data
US 2017/0113970 A1   Apr. 27, 2017

(30) Foreign Application Priority Data

May 16, 2014 (FR) ..................... 14 54423

(51) Int. Cl.
| | | |
|---|---|---|
| C04B 28/14 | (2006.01) | |
| C04B 28/06 | (2006.01) | |
| C04B 20/10 | (2006.01) | |
| C04B 40/00 | (2006.01) | |
| C04B 103/12 | (2006.01) | |

(52) U.S. Cl.
CPC .......... *C04B 28/14* (2013.01); *C04B 20/1022* (2013.01); *C04B 28/06* (2013.01); *C04B 40/0046* (2013.01); *C04B 2103/12* (2013.01)

(58) Field of Classification Search
CPC ......... C04B 24/04; C04B 28/04; C04B 28/06; C04B 28/14; C04B 20/1022; C04B 20/1023; C04B 14/04; C04B 14/308; C04B 40/0046; C04B 40/0085; C04B 2103/12

See application file for complete search history.

(56) References Cited

U.S. PATENT DOCUMENTS

| | | | | |
|---|---|---|---|---|
| 3,180,748 A | * | 4/1965 | Holmgren | C04B 28/06 106/692 |
| 4,595,664 A | * | 6/1986 | Nishino | F23D 14/14 431/326 |
| 7,074,269 B2 | | 7/2006 | Joubert et al. | |
| 2004/0255824 A1 | * | 12/2004 | Joubert | C04B 24/04 106/810 |
| 2013/0255542 A1 | * | 10/2013 | Clodic | C04B 28/06 106/695 |
| 2014/0338569 A1 | * | 11/2014 | Ostrander | C04B 7/32 106/692 |

FOREIGN PATENT DOCUMENTS

| | | | |
|---|---|---|---|
| CN | 102765738 A | * | 7/2012 |
| CN | 102 765 738 A | | 11/2012 |
| DE | 3420462 A | * | 12/1985 |
| JP | 58193727 A | * | 11/1983 |
| JP | 60225621 A | * | 11/1985 |
| JP | 2007 297250 A | | 11/2007 |
| JP | 2010-155737 | | 7/2010 |
| KR | 10200 7001 6170 A | | 2/2007 |
| WO | 03/010109 A1 | | 2/2003 |

OTHER PUBLICATIONS

Lafarge Aluminates: "Product data sheet Ciment Fondu", Jan. 31, 2006, XP055153654, Refractory applications.
International Search Report, dated Aug. 20, 2015, from corresponding PCT application.
Japanese Office Action for Application No. 2017-512448, dated Oct. 19, 2018, with English translation provided.

* cited by examiner

*Primary Examiner* — Anthony J Green
(74) *Attorney, Agent, or Firm* — Young & Thompson (57) ABSTRACT

Disclosed is an ultra-fast setting cement composition including at least amorphous calcium aluminate including by weight, as compared to amorphous calcium aluminate total weight, (a) from 35 to 55% of calcium oxide CaO (C), (b) from 19 to 55% of alumina $Al_2O_3$ (A), the C/A molar ratio being higher than or equal to 1.5, preferably higher than or equal to 1.7, characterized in that amorphous calcium aluminate is coated with a surface treatment including an organic compound having at least two hydrophilic functions and one hydrophobic chain. Also disclosed is a method to produce the cement composition, as well as to uses thereof.

20 Claims, 3 Drawing Sheets

ULTRA-FAST SETTING CEMENT BASED ON AMORPHOUS CALCIUM ALUMINATE COMPRISING A SURFACE TREATMENT

TECHNICAL FIELD OF THE INVENTION

The present invention relates to the field of ultra-fast setting cements to be used for preparing mortar or concrete.

In particular, the present invention relates to an ultra-fast setting cement composition based on amorphous calcium aluminate provided with a surface treatment so as to improve its service life, as well as to its method of production.

The present invention also relates to the use of the abovementioned cement composition so as to accelerate the setting of Portland cements or to optimize the ettringite formation.

TECHNICAL BACKGROUND OF THE INVENTION

There are many situations where an acceleration of the setting for a mortar or a concrete composition based on Portland cement and/or on calcium aluminate cement is expected. This is the case especially for the building or the repair of civil engineering works, such as street or road pavements, sidewalks. To be also mentioned are maintenance and construction of electric cable networks, pipe networks for gas and water distribution. Repair works for technical facilities often require underground cavities to be dug, which are sources of complications for the users of such facilities. Thus, it is essential for such cavities to be rapidly filled, so that said facilities can be put in service again as soon as possible after the end of the works.

During the recent years, the composition of cement-based systems has changed in favor of concrete formulations based on amorphous calcium aluminate enabling to obtain a (very) high initial strength thanks to their ultra-reactivity.

The document CN 102 765 738 describes for example an amorphous calcium aluminate composition, as well as the method for making the same. Amorphous calcium aluminate may be used as an additive for a cement-based composition, so as to improve its setting time or as an additive for steel production. In particular, amorphous calcium aluminate comprises, by weight, as compared to its total weight, from 40 to 60% of CaO (C), from 30 to 60% of $Al_2O_3$ (A), from 0.01 to 1% of S, from 1 to 10% of $SiO_2$, from 0.05 to 3% of $Fe_2O_3$, from 0.01 to 5% of $CaF_2$, from 1 to 10% of MgO, from 0 to 3% of $TiO_2$ and from 0.01 to 1% of P.

The ultra reactivity of amorphous cements in turn is made possible thanks to a very fast dissolution rate of this cement type when they are put in contact with water. Despite everything, such a high affinity with water makes it difficult to preserve the reactivity of these ultra-reactive cements, and of the formulations containing the same, especially under damp conditions.

It is thus an objective of the present invention to provide a new ultra-fast setting cement composition especially based on amorphous calcium aluminate, combined or not with other mineral binders such as Portland cement or calcium sulfate which avoids, at least partially, the abovementioned drawbacks.

In particular, the present invention aims at providing a new ultra-fast setting cement composition with an improved shelf-life and furthermore not impairing the properties of the mortar or concrete obtained from such a cement composition.

SUMMARY OF THE INVENTION

In order to remedy to the abovementioned drawback of the prior art, the present invention provides an ultra-fast setting cement composition comprising at least amorphous calcium aluminate comprising, by weight, as compared to amorphous calcium aluminate total weight (a) from 35 to 55% of calcium oxide CaO (C), (b) from 19 to 55% of alumina $Al_2O_3$ (A), the C/A molar ratio being higher than or equal to 1.5, preferably higher than or equal to 1.7, characterized in that amorphous calcium aluminate is coated with a surface treatment, in particular an anti-ageing surface treatment, comprising an organic compound having at least two hydrophilic functions and one hydrophobic chain.

As used herein, a "cement" is intended to mean a hydraulic binder, that is to say a finely ground mineral material which, when mixed together with water, forms a paste, which sets and hardens due to the reaction and to a hydration process and which, once hardened, remains resistant and stable even under water (Standard NF EN 197-1).

For all the description that follows, unless otherwise specified, values mentioned as ranging from "X to Y" or "comprised between X and Y" in the present invention are intended to include values X and Y.

As used herein, "amorphous calcium aluminate" is intended to mean that calcium aluminate comprises a rate of at least 60% amorphous phase and therefore a crystallization phase rate lower than or equal to 40% of the crystalline phase. In the context of the present invention, a rate of at least 60% amorphous phase is intended to mean at least 65%, at least 70%, at least 75%, at least 80%, at least 85%, at least 90%, at least 95%, at least 97%, at least 98%, at least 99%.

The crystalline phases may be $CaO.Al_2O_3$, $CaO.2Al_2O_3$, $3CaO.Al_2O_3$, $3CaO.3Al_2O_3+CaF_2$, $11CaO.7Al_2O_3.CaF_2$, $12CaO.7Al_2O_3$ or $3CaO.3Al_2O_3+CaSO_4$ or one of their combinations. Preferably, the crystalline phases are $CaO.Al_2O_3$, or $12CaO.7Al_2O_3$ or one of their combinations.

The present invention further relates to a method for producing an ultra-fast setting cement composition, such as described hereabove, comprising the following steps:

i) introducing into a furnace for melting raw material sources at least calcium oxide and alumina;

ii) curing in the melting furnace at a minimum temperature enabling the melting of the composition, typically around 1250° C., up to 2300° C. for a time period making it possible to achieve the complete melting of the raw materials, typically from 10 nm to 10 h, depending on the method and on the raw materials used;

iii) recovering said clinker of liquid calcium aluminate right at the furnace outlet;

iv) cooling down after curing of said liquid calcium aluminate-based clinker, so as to suddenly lower the temperature of the calcium aluminate-based clinker to a temperature below the crystallization temperature to obtain amorphous calcium aluminate;

v) grinding the amorphous calcium aluminate-based clinker, so as to obtain a calcium aluminate cement;

vi) adding an organic compound, so as to obtain an amorphous calcium aluminate-based cement provided with an anti-ageing surface treatment.

Lastly, the present invention also relates to the use of the ultra-fast setting cement composition to accelerate the setting of Portland cements, as well as to form ettringite, especially when amorphous calcium aluminate is combined with calcium sulfate in the presence, or not, of Portland cement.

Other non-limiting and advantageous characteristics of the composition and of the method according to the invention, either considered individually or according to any technically possible combination, will be described hereunder.

DESCRIPTION OF THE DRAWINGS

The description which follows by reference to the appended drawings, given as non-limiting examples, will better explain the content of the present invention and the way it may be implemented.

On the appended drawings.

DETAILED DESCRIPTION OF THE INVENTION

The applicant focused on the development of new cement compositions based on highly reactive amorphous calcium aluminate adapted to the requirements of the building professionals, that is to say provided with high mechanical properties and with a good storage stability, while facilitating the casting of such concrete or mortar produced from this type of cement.

As previously indicated, the present invention relates to an ultra-fast setting cement composition (hydraulic binder) comprising at least amorphous calcium aluminate comprising by weight, as compared to amorphous calcium aluminate total weight:

(a) from 35 to 55% of calcium oxide CaO (C), (b) from 19 to 55% of alumina $Al_2O_3$ (A), the C/A molar ratio being higher than or equal to 1.5, preferably higher than or equal to 1.7, most preferably higher than or equal to 2, and in particular ranging from 1.5 to 3, characterized in that amorphous calcium aluminate is coated with a surface anti-ageing treatment comprising an organic compound having at least two hydrophilic functions and one hydrophobic chain.

The applicant surprisingly discovered that an organic compound having at least two hydrophilic functions and one hydrophobic chain makes it possible to improve the service life of an amorphous calcium aluminate-based cement while preserving the reactivity or the mechanical resistance of the cement obtained.

The weight concentration of this organic compound within the cement composition advantageously ranges from 0.025% to 5% by weight as compared to the cement composition weight, preferably from 0.05% to 2.5%, advantageously from 0.1% to 1%.

As used herein, a "hydrophilic character" is intended to mean functions which enable to ensure the compatibility with a water-containing medium. In addition, these hydrophilic functions are advantageously capable of reacting with cations or metallic elements present in the hydraulic binder.

Functions, which may be suitably used in the present invention are especially carboxylic acid, acid anhydride, acid halide and primary amine functions.

Preferred functions of the invention are acid functions and acid anhydride functions.

The hydrophobic character of the organic product is provided by an aliphatic, aromatic, alkylaromatic or arylaliphatic hydrocarbon chain. Aliphatic, arylaliphatic, linear, cyclic, branched or substituted chains are preferred for the present invention. They advantageously comprise from 2 to 13 carbon atoms.

As will be described hereafter in the following description of the method of the invention, the organic compound in a first embodiment is introduced into the cement composition according to the invention during a co-grinding step of said organic compound as a powder and of an amorphous calcium aluminate-based clinker (that is to say, having undergone a quenching step after burning). In a second embodiment, said organic compound is hot blended together with an amorphous calcium aluminate-based cement at a temperature higher than the melting temperature of said organic compound and at a temperature lower than its decomposition temperature, prior to being ground.

Organic compounds with a film-forming character will be therefore preferred.

However, this property is preferably only desired. Thus, a film-forming but non-wetting organic compound which can adsorb on the hydraulic binder grains is also suitable for the invention.

To be mentioned as organic compounds that may be suitably used in the present invention are polycarboxylic acids like dicarboxylic acids such as glutaric acid, succinic acid, adipic acid, octanedioic acid, decanedioic acid, dodecanedioic acid, brassylic acid and their anhydrides and acid halides, phtalic acids such as orthophtalic acid, terephtalic acid, isophtalic acid or one of their combinations. Adipic acid is in particular preferred.

It can also be envisaged, without departing from the scope of the present invention to use acids as mixtures and more particularly to use a combination of adipic, succinic and glutaric acids. Such mixture is a by-product of adipic acid production in industrial processes.

Such organic compounds may especially correspond to those described in WO 03/010109 relating to non-amorphous hydraulic (crystalline) binders. But, in a well-known manner, amorphous calcium aluminates according to the invention have surface properties, which are very different from those of crystalline hydraulic binders, and in particular they have a much higher dissolution rate, which makes non obvious the fact that the cement composition of the invention could be coated with such organic compounds as anti-ageing surface agents.

The amorphous calcium aluminates thus coated with the anti-ageing organic compound of the invention are less sensitive to moisture regain, thus enabling to increase their shelf life in various conditioning options, such as silos, bags, containers, for example. In addition, the powder flowability is improved when emptying the containers. Likewise, the shelf life of formulations containing calcium aluminates coated with the anti-ageing organic compound of the invention is also extended. As used herein, a "formulation" is intended to mean a formulation which binder phase comprises amorphous calcium aluminate or calcium aluminate associated with other binders amongst which Portland cement and/or calcium sulfate.

In particular, amorphous calcium aluminate comprises by weight, as compared to its total weight, (a) from 35 to 55%, preferably from 42 to 52%, and even more preferably from 47 to 51% of calcium oxide.

When the calcium oxide content is lower than 35% by weight, the cement composition according to the invention is less reactive; whereas when calcium oxide content is higher than 55%, it becomes more difficult to make the compound melt in a melting furnace and in particular in a reverberatory furnace.

Typically, amorphous calcium aluminate may comprise by weight, as compared to its total weight, (b) from 19 to 55%, preferably from 25 to 48%, and even more preferably from 34 to 42% of alumina.

The alumina content depends on particular on the calcium oxide content and should be such that the C/A molar ratio be higher than or equal to 1.5, preferably higher than 1.7, and most preferably higher than or equal to 2 and in particular ranging from 1.5 to 3.

Typically, amorphous calcium aluminate comprises other transition metal oxides or metalloid oxides In particular, amorphous calcium aluminate comprises, by weight, as compared to amorphous calcium aluminate weight, from 3 to 16%, preferably from 5 to 10%, most preferably from 5 to 8% of iron oxide ($Fe_2O_3$).

As used herein, "at least 5% of iron oxide $Fe_2O_3$" includes all the following weight percentages: 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%.

Thus, contrary to what could have been expected by a person skilled in the art, a relatively high iron oxide content within the cement composition does not impair the ultra-reactivity of amorphous calcium aluminate.

Moreover, the applicant surprisingly discovered that a particular iron oxide $Fe_2O_3$ content could enable to regulate the reaction kinetics of the amorphous calcium aluminates, while preserving the mechanical resistance of the cement obtained and especially its initial strength.

Indeed, when the C/A molar ratio of the amorphous calcium aluminates is high (>1.5), as is the case for the cement composition according to the invention, the hydration reaction of the amorphous calcium aluminates is ultra-fast. Practically, implementing a cement composition based on such compounds may reveal complicated, or even impossible because of the very fast set time of the amorphous calcium aluminates (of about ten seconds). As is classically known, it becomes than desirable to add a set inhibitor, such as boric acid or citric acid so as to delay the setting. However, such an addition may have a negative effect on the development of the mechanical properties and be especially detrimental to the strength build-up in the mortar or in the concrete. Thus, the cement composition according to such embodiment advantageously enables to avoid the use of such a set-controlling agent and to obtain a good initial mechanical resistance.

Moreover, according to this alternative, the cement composition of the invention advantageously enables to reduce the production costs resulting from the use of raw materials less expensive than those used for traditional cement compositions, especially those based on amorphous calcium aluminate with a set accelerator or retarder. Indeed, according to the invention, it is no more necessary to add a set inhibitor, or to select raw materials that are very rich in alumina and calcium oxide (that is to say with few impurities).

According to this alternative embodiment, the calcium aluminate present in the cement composition is thus rich in iron.

Thus, contrary to what could have been expected by a person skilled in the art, a relatively high iron oxide content within the cement composition does not impair the ultra-reactivity of amorphous calcium aluminate, but simply enables to regulate the setting thereof, while enabling to obtain a highly reliable mortar composition.

Furthermore, amorphous calcium aluminate may comprise by weight as compared to amorphous calcium aluminate total weight from 1 to 10% and more particularly from 3 to 6% of silica $SiO_2$.

The amorphous calcium aluminate according to the invention may comprise impurities ranging from 0 to 5%, preferably from 0 to 3% by weight, as compared to the aluminate calcium total weight. These impurities may be for example titanium oxide ($TiO_2$) or magnesia (MgO).

According to a characteristic of the invention, amorphous calcium aluminate present in the cement composition according to the invention has a measured dissolution rate in water higher than or equal to $15 \cdot 10^{-6}$, preferably higher than or equal at 20 $mol \cdot S^{-1} \cdot m^{-2}$. This rate is measured through determination of the calcium released in water within 5 minutes by calcium aluminate in a slurry at 0.5 $g \cdot l^{-1}$. The calcium concentration is divided by 300 seconds (5 minutes) and by the calcium aluminate surface calculated by the product of the BET surface area, expressed in $m^2 \cdot g^{-1}$, and of the material weight (0.5 g for 1 liter).

According to a further characteristic of the invention, amorphous calcium aluminate has a specific surface area (Blaine) measured according to Standard NF EN 196-6 ranging from 2000 to 7000 $cm^2/g$ and preferably ranging from 3000 to 5000 $cm^2/g$.

According to a further characteristic of the invention, the cement composition has a specific gravity ranging from 2 to 5, preferably ranging from 2.5 to 3.5 and most preferably ranging from 2.7 to 3.1 $g/cm^3$.

In a preferred embodiment of the invention, the cement composition comprises calcium sulfate in addition to amorphous calcium aluminate.

Typically, calcium sulfate is in the form of anhydrite, gypsum or hemi-hydrate, of natural or synthetic origin. Preferably, calcium sulfate is in the form of anhydrite of type I or II.

Advantageously, the cement composition comprises, by weight as compared to the cement composition total weight, from 30 to 70% of amorphous calcium aluminate, such as previously defined, and from 30 to 70% of calcium sulfate, in particular the cement composition according to the invention may comprise from 45 to 55% of amorphous calcium aluminate and from 45 to 55% of calcium sulfate.

A mortar or a concrete composed of this type of compounds, that is to say of amorphous calcium aluminate such as previously described and of calcium sulfate, has many advantages as compared to a traditional composition, the main advantages being a fast setting time and a fast development of strength and a suitable shrinkage compensation. These advantages are bound to the hydration process and especially to the presence of calcium sulfate.

The present invention also relates to a method for making the cement composition according to the invention.

In particular, the method for producing an ultra-fast setting cement composition with an improved ageing behavior such as described hereabove comprises the following steps:

i) introducing into a furnace for melting raw material sources at least calcium oxide and alumina;

ii) curing in the melting furnace at a minimum temperature enabling the melting of the composition, typically at around 1250° C. to 2300° C. (for example, around 1400° C.) for a time period making it possible to achieve the complete melting of the raw materials, typically from 10 nm to 10 h, depending on the method and on the raw materials used;

iii) recovering right out of the furnace said liquid calcium aluminate-based clinker;

iv) cooling down after curing of said liquid calcium aluminate-based clinker, so as to suddenly lower the temperature of the calcium aluminate-based clinker to a temperature below the crystallization temperature to obtain amorphous calcium aluminate;

v) grinding the amorphous calcium aluminate-based clinker, so as to obtain a calcium aluminate cement;

vi) adding an organic compound, so as to obtain an amorphous calcium aluminate-based cement provided with an anti-ageing surface treatment.

According to a first alternative embodiment, step vi) may be carried out concomitantly to step v) by co-grinding the amorphous calcium aluminate-based clinker together with an organic compound (such as previously defined) coming as a powder, for example with an average particle size lower than or equal to 300 µm, so as to obtain a calcium aluminate cement including a surface anti-ageing treatment.

According to another alternative embodiment, step vi) may be effected by hot-blending the calcium aluminate-containing cement obtained in step v) with an organic compound (such as previously defined) at a temperature higher than the melting temperature of said organic compound and at a temperature lower than its decomposition temperature. These temperatures or temperature ranges of course depend on the nature of the organic compound.

Thus, in a first embodiment of the invention, the coating of the amorphous calcium aluminate grains is carried out at a low temperature, for example at room temperature, and more generally within a room temperature range, wherein the organic compound is in a solid state. The organic compound used for the mixture may come as granules or as a powder, which grains may be either fine or coarse. As an example, it is also possible to add the organic compound as a fine powder, for example comprising particles with an average size lower than or equal to 300 µm, in particular lower than or equal to 100 µm, preferably lower than or equal to 50 µm, more preferably with an average size substantially lower than the binder grain size, so as to obtain a coating of the binder grains by the organic compound particles.

In a second embodiment, the temperature is set to be higher than the melting temperature of said organic compound and lower than its decomposition temperature. As an example, with adipic acid or combinations of adipic, glutaric and succinic acids, this temperature ranges from 140° C. to 270° C.

According to the method of the invention, the calcium source may be selected from limestone, lime and by-products resulting from methods using limestone and lime, like clinker or other slags derived from steel production or electrometallurgy, or one of their combinations; whereas the alumina source or even the iron oxide source may be chosen from bauxite (bauxite monohydrate and/or bauxite trihydrate), corundum wheels, catalyst substrates, fire bricks, hydroxides, metallurgical grade aluminas, calcinated aluminas and fused aluminas, by-products of the aluminum processing and offgrades with a high alumina content, or one of their combinations.

For example, the bauxite trihydrate may comprise by weight, from 46 to 50% of alumina, from 14 to 20% of iron oxide and from 7 to 12% of silica. It is then both source of alumina and of iron oxide These raw materials that are sources of calcium oxide, of aluminum or iron generally come as blocks, such as bauxite or limestone blocks.

Typically, from 30 to 50%, preferably from 35 to 45% and most preferably 40% by weight of the calcium oxide source and from 50 to 70%, preferably from 55 to 65% and most preferably 60% by weight of the alumina source (bauxite block) are introduced into the furnace, as compared to the calcium oxide and alumina source total weight.

In particular, the melting furnace used in the method of the invention is generally a reverberatory furnace.

A reverberatory furnace has for example a L-section, that is to say a vertical part and a horizontal part which communicate with each other. The vertical part may reach as high as several meters.

Generally, limestone and bauxite blocks are introduced into the melting furnace through an aperture located on the upper portion of the vertical part. These blocs are loaded into the furnace so as to fully occupy the volume of this vertical part and they thus form, at a junction between horizontal part and vertical part, a slope-shaped pile of blocks. The latter is then attacked by a flame located in the furnace horizontal part, in front of the slope-shaped pile. The flame heats at a temperature above 1500° C., or even above 2000° C. It thus brings the required calories so as to make limestone and bauxite blocks melt, thus forming a material liquid bath. The raw material temperature in the furnace typically reaches up to 1400-1500° C. The materials, once melted, are discharged through a tap hole located in the horizontal part of the furnace.

During the process, combustion gases develop and go a counter-current path as compared to the blocks. They are then discharged through a gas stack located in the upper portion of the furnace vertical part. These gases, with a temperature of about 1500° C., thus circulate between the blocks above the slope-shaped pile and pre-heat the blocks through the transfer of heat.

The raw material blocks, from the moment when they are introduced to the contact with the flame, thus undergo beforehand a drying process, then a dehydration and a decarbonation mediated by the combustion gases going up the vertical part of the furnace. The preheating of the raw materials by the combustion gases is made possible due to the porous stacking of the bauxite and limestone blocks, which large enough diameter allows the gases to flow therethrough.

Thus, the firing of the raw materials sources of at least calcium oxide, alumina and iron oxide is effected at a temperature ranging preferably from 1250 to 2300° C., preferably from 1300 to 2000° C. and typically from 1400 to 1600° C., for a time period ranging preferably from 5 to 12 hours, in particular from 6 to 10 hours.

At the outlet of the furnace, a calcium aluminate clinker is thus obtained. This clinker is quenched immediately after the firing, so as to reduce the temperature of the calcium aluminate-based clinker to a temperature below the crystallization temperature and to obtain an amorphous calcium aluminate-based clinker.

Preferably, the cooling down may be conducted with a gradient of from 10 to 25° C./second, preferably of from 15 to 20° C./second.

As an example, the quenching may be effected by air quenching the liquid clinker with a temperature of air not exceeding 500° C., preferably not exceeding 100° C. for a time period longer than or equal to 1 minute, advantageously longer than or equal to 15 seconds. For example, a horizontal air blast will be provided at the outlet of the furnace to blow and disperse the clinker in order to accelerate the cooling down thereof.

Once cooled down, the amorphous calcium aluminate-based clinker may be finely ground to obtain an amorphous calcium aluminate-based (hydraulic binder) cement, with a specific surface area (Blaine) ranging from 2000 to 7000 $cm^2/g$ and preferably from 3000 to 5000 $cm^2/g$.

Preferably, the method comprises a step, wherein calcium sulfate is co-ground with the calcium aluminate clinker during step v) or a step, wherein calcium sulfate is combined with the calcium aluminate-containing cement before or after the step of mixing with the organic compound.

Thus, according to an alternative embodiment, the calcium aluminate clinker may be co-ground with calcium sulfate so as to form an amorphous calcium sulfo-aluminate cement.

According to another alternative embodiment, calcium sulfate may be combined with the amorphous calcium aluminate-based cement, previously ground at the end of step v).

When the method of production of a cement composition according to the invention comprises a step of calcium sulfate addition, the cement composition comprises preferably by weight, as compared to the cement composition total weight, from 30 to 70% of amorphous calcium aluminate (such as previously defined) and from 30 to 70% of calcium sulfate, in particular the cement composition according to the invention may comprise from 45 to 55% of amorphous calcium aluminate and from 45 to 55% of calcium sulfate.

This method enables for example to prepare a cement composition based on amorphous calcium aluminates that are rich in iron oxide $Fe_2O_3$, such as described hereabove. Of course, the cement composition prepared according to this method has the same characteristics as the composition according to the invention. Those characteristics, because they have already been previously addressed, will not be described in more details hereafter.

The cement composition of the invention may be used for making mortar, concrete or other traditional compositions based on mineral binders. It should be appreciated that the presence of the organic compound neither impairs the implementation conditions of these mortar- or concrete-based compositions nor their mechanical and rheological properties. On the contrary, it may, for some applications, improve the implementation methods and the mechanical properties of the products or of the works made from these compositions.

A mortar composition generally is in the form of a ready-to-use dry powder and may comprise at least the cement composition such as described hereabove as a hydraulic binder and at least one aggregate, as well as optionally one additive and/or common admixture.

For example, a dry mortar or dry concrete composition comprises, by weight, as compared to said mortar composition total weight:

from 15 to 50%, preferably from 30 to 40% of hydraulic binder, such as the cement composition according to the invention and/or a Portland cement and/or calcium sulfate, from 25 to 80%, preferably from 50 to 70% of mineral fillers, from 0 to 2%, preferably from 0.05 to 0.5% of a fluidizing composition, from 0 to 5% of other additives (accelerators, retarders, antifoams, air-entraining agents, concrete workability-modifying agents, water-repellent agents). The latter are known from the person skilled in the art.

As previously indicated, since the cement composition according to the invention may be rich in iron oxide capable of regulating the setting of the hydraulic binder (calcium aluminate with or without calcium sulfate), it is not necessarily required to add a setting retarder to the dry mortar or concrete composition.

However, according to an alternative embodiment, a mortar composition or a concrete composition will comprise setting regulators, such as setting accelerators or setting inhibitors, superplasticizers or hardening accelerators. These additives are well known from the state of the art and their proportions will be suitably adapted by the person skilled in the art.

As is well known, mortar comprises a combination of cement and sand/fillers, whereas the concrete may in addition contain some aggregates, each in proportions known from the person skilled in the art.

It is also an object of the present invention to provide the use of the ultra-fast setting cement composition, such as described hereabove, to accelerate the setting of Portland cements.

Any Portland cement can be suitably used, such as normal Portland cement, fast-setting Portland cement, ultra-fast setting Portland cement, white Portland cement, etc.

The amount of cement composition according to the invention to be added for such a use preferably varies from 2 to 10% by weight of the Portland cement weight, depending on the nature of the other components used and on the expected characteristics. The nature of the Portland, first of all its C3A content, its fineness, the addition types and the nature of calcium sulfate in the cement composition of the invention, if any, or the nature of calcium sulfate present in the Portland, will determine the amount to be added.

The cement composition of the invention, because of the chemical structure (amorphous calcium aluminate provided with an anti-ageing surface treatment, optionally enriched with iron oxide combined or not with calcium sulfate), because of the amorphous and fine character thereof provide calcium aluminate with a strong activity. The combination rate with Portland cement's sulfates will be higher and faster than with classical calcium aluminates (crystallized). Moreover, the presence of calcium sulfate anhydrite enables to rapidly obtain resistances through the ettringite formation complementary to the hydrated phases of the Portland. Thus, the efficiency of the cement composition of the invention is higher than that of a traditional calcium aluminate and the required amounts for the same fastness are not so high.

Furthermore, it is an object of the present invention to provide the use of the ultra-fast setting cement composition such as described hereabove to form ettringite when it comprises calcium sulfate.

The following examples are intended to illustrate the invention without limiting the same. Unless otherwise specified in the following description, percentages are expressed by weight.

EXAMPLES

A) Preparation of Cement Compositions

Three cement compositions according to the invention, that is to say B1, B2 and B3, and three comparative compositions, i.e. A1, A2 and A3, have been prepared. Comparative compositions A1, A2 and A3 are cements based on amorphous calcium aluminates not comprising any anti-ageing agent, whereas cement compositions B1, B2 and B3 according to the invention comprise such an anti-ageing agent.

All the cements have been obtained through a melting process in a reverberatory melting furnace for a time period of 8 h at a temperature of 1500° C. Clinkers at the outlet of the furnace did undergo a quenching of an air flow of 20° C. for around 15 seconds so as to obtain an amorphous calcium aluminate-based clinker. Clinkers have thereafter been ground so as to obtain a Blaine surface area of 3000 cm²/g depending on the tested compositions.

The various formulations of the compositions are given in Table 1 hereunder:

TABLE 1

| Cement composition ex. | CaO | Al$_2$O$_3$ | SiO$_2$ | Fe$_2$O$_3$ | Others | Blaine fineness (cm²/g) | Surface treatment (% by weight as compared to the cement composition weight) |
|---|---|---|---|---|---|---|---|
| A1 | 49.6 | 42.8 | 3.7 | 1.5 | 2.4 | 3000 | no |
| A2 | 49.3 | 44.4 | 5.2 | 1.1 | 0 | 3000 | no |
| A3 | 47.5 | 36.5 | 4.4 | 7.2 | 4.4 | 3000 | no |
| B1 | 49.6 | 42.8 | 3.7 | 1.5 | 2.4 | 3000 | 0.1% adipic acid and 0.2% paraffin |
| B2 | 49.3 | 44.4 | 5.2 | 1.1 | 0 | 3000 | 0.1% adipic acid and 0.2% paraffin |
| B3 | 47.5 | 36.5 | 4.4 | 7.2 | 4.4 | 3000 | 0.1% adipic acid and 0.2% paraffin |

B) Preparation of the Mortar Compositions

Cement compositions A1 and B1 hereabove have been used to prepare two mortar compositions, which formulations are given in following Table 2:

TABLE 2

| | | Amounts (weight %) | |
|---|---|---|---|
| Compounds | Functions | A1 | B1 |
| A1 | Binder | 60 | — |
| B1 | Binder | — | 60 |
| NE14 | Siliceous filler | 40 | |
| Conpac 500 | Superplasticizer | 0.2 | |
| Citric acid | Setting inhibitor | 0.05 | |
| Water | | 14 | |

C) Characterizations

Weight Regain

The weight regain assay is carried out on cement alone (A1 or B1) using an aluminum cup filled with 25 grams of test cement. The thus prepared cup is weighed and placed under temperature 20° C. and 70% relative humidity. The weight regain consists in monitoring the cup weight evolution as a function of exhibition time. The result is expressed in weight regain % as compared to the cement weight.

Initial Reactivity, Reactivity Evolution and Impact on Ageing

Mortar alone or cement alone is manually combined with the required amount of water (35% water for cement alone test and 14% for formulation tests) for thirty seconds using a tongue depressor. The thus prepared mix is then immediately poured in a plastic container (diameter 25 mm, height 100 mm) wherein a thermocouple type K has been introduced, connected to a recorder Testo (Testo 177).

The reactivity values obtained correspond to the time required to reach the maximum temperature. The reactivity measurements are effected on both fresh cement (cement alone or as a formulation) and aged cement. In this case, the test cement is deposited as a 5 mm-thin layer in a plastic vessel, then placed in a temperature-regulated chamber set to 20° C. and 50% relative humidity. The thus conditioned cements are stored under such temperature regulated conditions during the various desired time periods. At these times and for formulation assays, these cements are combined using a mixer Turbula to the other components of the formulation, which had been stored at 23° C. and 50% humidity.

D) Results

Figure 1:
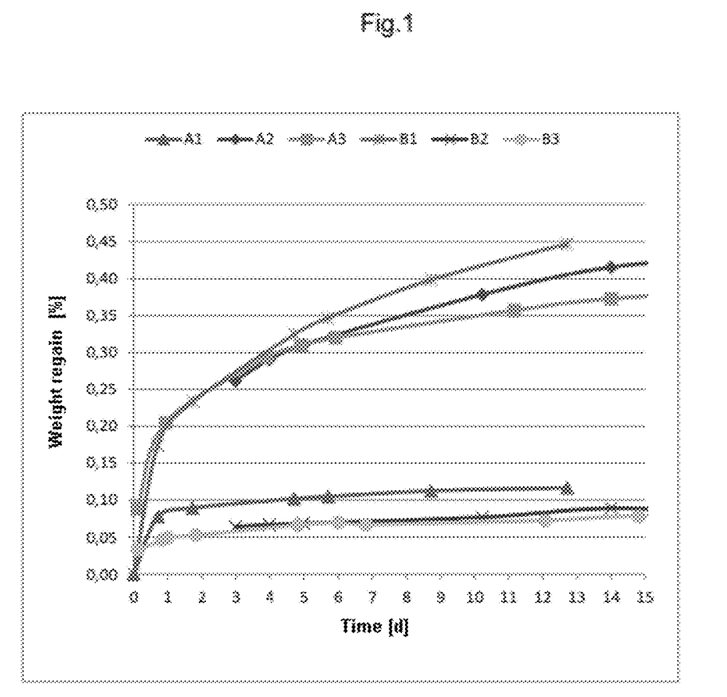
FIG. 1 is a diagram illustrating the weight regain in percentage for six cement compositions: three according to the invention (B1, B2 and B3) and three according to the prior art (A1, A2 and A3, which have the same compositions as B1, B2 and B3, respectively, except that B1, B2 and B3 comprise in addition an anti-ageing treatment) as a function of time in days.
Figure 2:
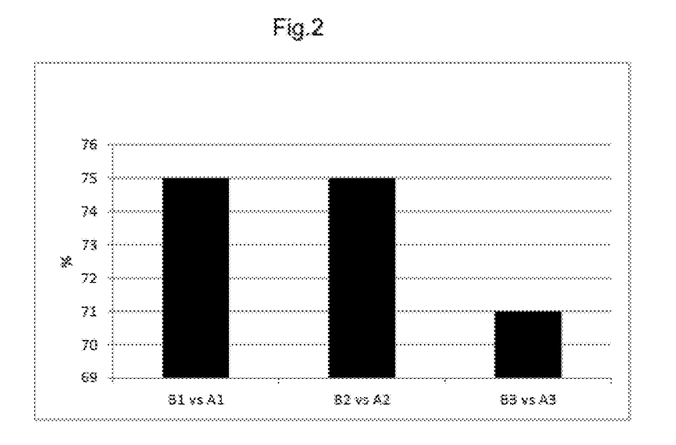
FIG. 2 is a diagram illustrating the weight regain variations of the cement compositions depicted on FIG. 1, that is to say comparing B1 to A1, B2 to A2 and B3 to A3 after 13 days of storage at 20° C./70% relative humidity.

As illustrated on FIGS. 1 and 2, the cements according to the invention (B1 to B3) enable to reduce the weight regain after 13 days of storage at 20° C. and 70% relative humidity by more than 70%, or even by 75%, for compositions B1 and B2, as compared to compositions A1 and A2 respectively.

Thus, the cement compositions according to the invention provided with an anti-ageing agent have a much lower weight regain than the cement compositions according to the prior art.

As a consequence the cement compositions of the invention are less sensitive to moisture and therefore have an improved shelf-life as compared to the cement compositions of the prior art.

Figure 3:
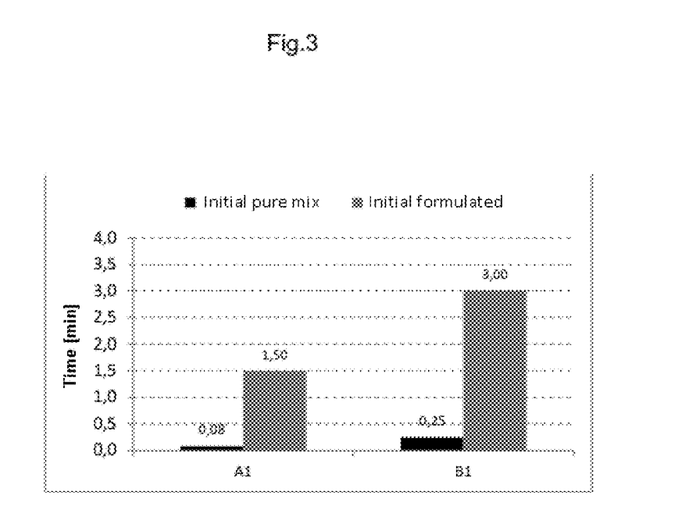
FIG. 3 is a diagram illustrating cements A1 and B1 initial reactivity ("initial pure mix") and the initial reactivity for both mortar compositions comprising respectively cements A1 or B1 ("initial formulated").
Figure 4:
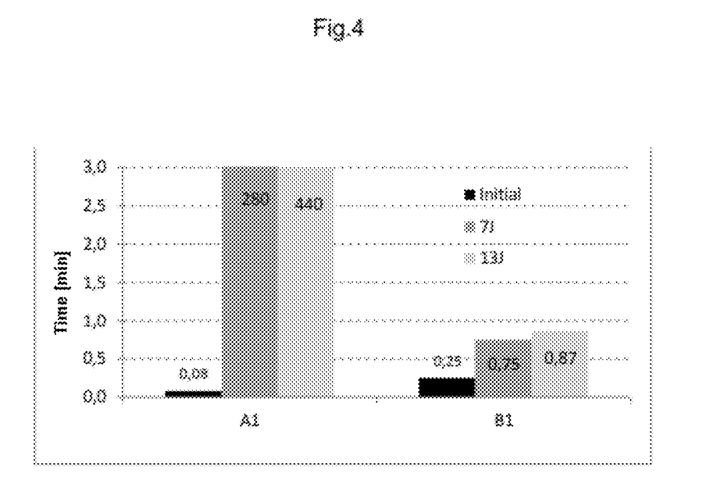
FIG. 4 is a diagram illustrating the impact of the ageing process on pure mix reactivity (expressed in minutes) of cement compositions A1 and B1 during ageing time (expressed in days)
Figure 5:
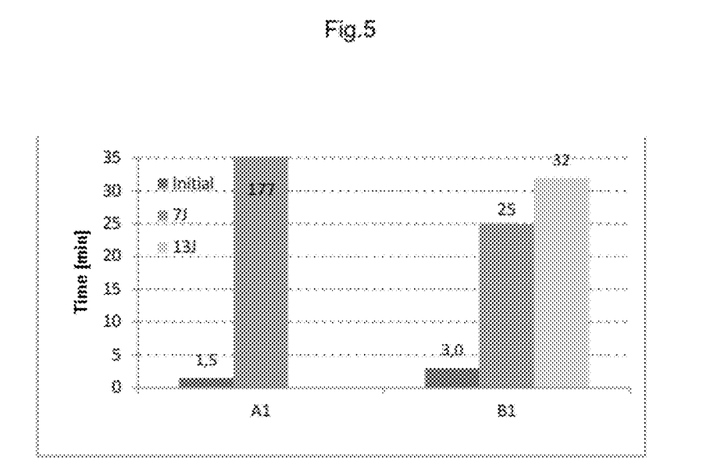
FIG. 5 is a diagram illustrating the impact of the ageing process on the reactivity in formulation (expressed in minutes) of cement compositions A1 and B1 incorporated into a mortar composition during ageing time (expressed in days).

Moreover, as observed on FIGS. 3 to 5, the reactivity of pure-calcium aluminates or as mortar formulations is not impacted by the addition of the anti-ageing agent according to the invention.

Following results are obtained indeed, for which "initial" means the cement reactivity prior to ageing and "24 h, 7 d, 13 d" correspond to the reactivity measured after 24 h, 7 days and 13 days ageing. The reactivity values measured are expressed in minutes.

TABLE 3

|    | Initial | 24 H | 7 D    | 13 D   |
|----|---------|------|--------|--------|
| B1 | 0.25    | 0.42 | 0.75   | 0.87   |
| A1 | 0.08    | 0.42 | 280.00 | 440.00 |

Initial reactivity values respectively of A1 compared to B1 are not significantly different. Material B1 comprising the cement of amorphous calcium aluminate coated with the anti-ageing treatment of the invention has an outstanding preservation of its reactivity even after 13 days ageing.

On the contrary, the reactivity of the amorphous calcium aluminate-containing cement according to the prior art changed from 0.08 minute to 440 minutes. The amorphous calcium aluminate-containing cement according to the invention therefore provides indeed an increase in the service life of the formulations containing the same.

Although the present invention has been described in relation to a particular embodiment, it should be appreciated that in no way it is limited thereto and that it includes all the technical equivalents of the described means, as well as their combinations, provided these all are within the scope of the invention.

The invention claimed is:

1. An ultra-fast setting cement composition comprising at least amorphous calcium aluminate comprising by weight, as compared to amorphous calcium aluminate total weight:
   (a) from 35 to 55% of calcium oxide CaO (C),
   (b) from 19 to 55% of alumina $Al_2O_3$ (A), the C/A molar ratio being higher than or equal to 1.5,
   (c) from 0 to 10% of silica $SiO_2$, and
   (d) from 5 to 16% iron oxide Fe2O3,
   wherein amorphous calcium aluminate is coated with a surface treatment comprising an organic compound having at least two hydrophilic functions and one hydrophobic chain, and wherein said amorphous calcium aluminate comprises at least 60% of amorphous phase.

2. The cement composition according to claim 1, wherein the C/A molar ratio is higher than or equal to 1.7.

3. The cement composition according to claim 1, wherein the weight concentration of this organic compound within the cement composition ranges from 0.025% to 5% by weight, as compared to the cement composition weight.

4. The cement composition according to claim 3, wherein the weight concentration of this organic compound within the cement composition ranges from 0.05% to 2.5%, by weight, as compared to the cement composition weight.

5. The cement composition according to claim 1, wherein the organic compound is a compound comprising at least two acid, acid halide or acid anhydride functions.

6. The cement composition according to claim 1, wherein the organic compound is a compound comprising one aliphatic, arylaliphatic, aromatic, or alkylaromatic hydrophobic chain.

7. The cement composition according to claim 6, wherein said hydrophobic chain comprises 2 to 13 carbon atoms.

8. The cement composition according to claim 1, wherein the organic compound is selected from the group consisting of succinic, sebacic, adipic, octanedioic, decanedioic, dodecanedioic, brassylic, glutaric acids and combinations thereof.

9. The cement composition according to claim 8, wherein the organic compound is a combination of adipic, glutaric and succinic acids.

10. The cement composition according to claim 1, wherein amorphous calcium aluminate further comprises by weight, as compared to amorphous aluminate calcium total weight, from 1 to 10% of silica $SiO_2$.

11. The cement composition according to claim 1, wherein said amorphous calcium aluminate comprises by weight as compared to said amorphous calcium aluminate total weight from 25 to 48% of alumina (b).

12. The cement composition according to claim 11, wherein said amorphous calcium aluminate comprises by weight as compared to said amorphous calcium aluminate total weight from 34 to 42% of alumina (b).

13. The cement composition according to claim 10, wherein said amorphous calcium aluminate comprises by weight, as compared to said amorphous calcium aluminate total weight from 5 to 10% of iron oxide (d).

14. The cement composition according to claim 13, wherein said amorphous calcium aluminate comprises by weight, as compared to said amorphous calcium aluminate total weight, from 5 to 8% of iron oxide (d).

15. The cement composition according to claim 1, wherein said amorphous calcium aluminate has a dissolution rate in water higher than or equal to $15.10^{-6}$ $mol \cdot S^{-1} \cdot m^{-2}$.

16. The cement composition according to claim 1, further comprising by weight, as compared to the cement composition total weight, from 30 to 70% of calcium sulfate, and wherein said amorphous calcium aluminate is from 30 to 70% by weight, as compared to the cement composition total weight.

17. A method for producing the ultra-fast setting cement composition according to claim 1, comprising the following steps:
   i) introducing into a melting furnace for melting raw material sources raw materials comprising at least calcium oxide and alumina;
   ii) curing in the melting furnace at a minimum temperature to melt the raw materials for a time period sufficient to achieve a complete melting of the raw materials so as to obtain a liquid calcium aluminate-based clinker;
   iii) recovering right at a furnace outlet of the melting furnace said liquid calcium aluminate-based clinker, said calcium aluminate-based clinker having a crystallization temperature below a temperature at which it is recovered;
   iv) cooling down after curing of said liquid calcium aluminate-based clinker, so as to suddenly lower the temperature of the calcium aluminate-based clinker at which it is recovered to a temperature below the crystallization temperature of said calcium aluminate-based clinker to obtain amorphous calcium aluminate;
   v) grinding the amorphous calcium aluminate-based clinker, so as to obtain a calcium aluminate cement; and
   vi) adding an organic compound, so as to obtain an amorphous calcium aluminate-based cement provided with an anti-ageing surface treatment.

18. The method according to claim 17, wherein either step vi) is carried out concomitantly to step v) by co-grinding the amorphous calcium aluminate-based clinker with the organic compound coming as a powder, or step vi) is carried out by hot-blending the calcium aluminate-containing cement obtained in step v) with the organic compound at a temperature higher than a temperature at which said organic compound melts and at a temperature lower than a temperature at which said organic compound decomposes.

19. The method according to claim 17, further comprising adding calcium sulfate to the clinker or to the amorphous calcium aluminate-containing cement.

20. The method according to claim 17, wherein the melting furnace is a reverberatory furnace.

* * * * *